Woodruff & Townsend,
Sharpening Reciprocating Saws.
Nº 6,858.  Patented Nov. 6, 1849.
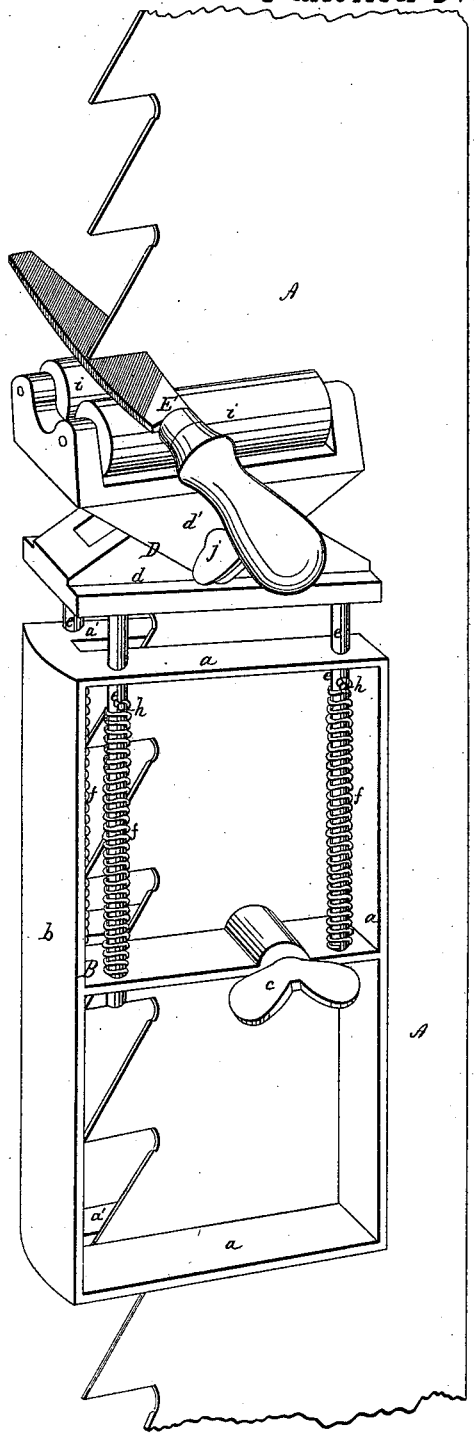

UNITED STATES PATENT OFFICE.

JEROME B. WOODRUFF, OF WASHINGTON, DISTRICT OF COLUMBIA, AND BENJAMIN M. TOWNSEND, OF QUINCY, ILLINOIS.

FILE-SUPPORTER.

Specification of Letters Patent No. 6,858, dated November 6, 1849.

*To all whom it may concern:*

Be it known that we, JEROME B. WOODRUFF, of Washington, in the District of Columbia, and BENJAMIN M. TOWNSEND, of Quincy, in the county of Adams and State of Illinois, have invented a new and useful Machine for Filing Saws; and we do hereby declare that the following is a full, clear, and exact description of our invention, and of the characteristics which distinguish it from all others heretofore known, reference being had to the accompanying drawing, which forms part of this specification and represents a perspective view of our saw-filer applied to a mill saw.

Our invention consists of a stock which embraces the saw and is secured to it by clamp screws, the stock has an adjustable frame, mounted upon one of its ends, which is furnished with a pair of parallel rolls by which the file is supported against the saw teeth, the pressure being given by a set of springs acting upon the adjustable frame.

In the drawing A represents a portion of a mill saw to which the saw-filer is applied. The latter consists of a stock B formed of two cheeks $a$, $a'$, united by a back $b$, and secured to the saw by a clamp screw $c$. On the stock is mounted the frame D. This is composed of two members $d$, $d'$. The lower consists of a forked frame ($d$) which also embraces the saw and is connected with the stock by guide rods $e$, $e$, in such manner that it can be moved from or toward its end. Springs $f$, are coiled upon the guide rods which tend to press the frame from the end of the stock, the distance to which it can be moved being limited by pins $h$, passing through the guide rods which strike against the top bar of the stock B. The other member of the adjustable frame is also a forked frame $d'$ embracing the sides of the saw, and furnished with two rolls $i$, $i$, parallel to each other; this frame is attached to the lower by a hinge on which it can be turned to vary the inclination of the rolls; the pivot of the hinge is a clamp screw $j$, by tightening which the upper frame is secured in any required position.

The operation of this saw-filer is as follows; it is applied to the saw as represented in the drawing, and the file E is inserted between the tooth to be filed and the rolls $i$, $i$, the stock is shoved toward the file until the requisite tension is given to the springs $f$, $f$; which press the file against the tooth, and is secured to the saw by the clamp screw $c$; the upper member $d'$, of the adjustable frame being now adjusted to the slant required in the tooth, the hands of the workman are applied to the file, which being moved to and fro is kept in its proper position for filing and is pressed continuously against the saw tooth by the rolls.

The advantages of this simple and efficient contrivance are evident to all who are acquainted with the difficulties of filing a saw in a workmanlike manner. Where the file is guided by hand alone, long practice and great skill are required to enable the workman to file the saw truly, as there is a constant tendency to bevel the teeth to one side or the other, or to file them rounding; in the former case the saw will not run true, and in the latter it will not cut. By the employment of our saw-filer, this difficulty is done away with, as an inexperienced hand can learn with it in the course of half an hour to file a saw more truly than the most skillful can without it. The applicability of this machine is not confined to straight saws, as it is of the greatest advantage in filing circular saws, which owing to their rapid motion require the greatest nicety in order to file them truly.

What we claim as our invention and desire to secure by Letters Patent is—

The combination of the yielding guide rolls for supporting a hand file during the operation of sharpening the teeth of saws with the adjustable clamp stock on which they are mounted substantially as herein set forth.

In testimony whereof we have hereunto signed our names this twenty-seventh day of September 1849.

JEROME B. WOODRUFF.
BENJAMIN M. TOWNSEND.

Witnesses:
WM. D. WASHINGTON,
E. S. RENWICK.